United States Patent [19]

Takahashi

[11] Patent Number: 4,646,008

[45] Date of Patent: Feb. 24, 1987

[54] SYSTEM FOR DIAGNOSING AN INTERNAL COMBUSTION ENGINE

[75] Inventor: Toshio Takahashi, Tokyo, Japan

[73] Assignee: Fuji Jukogyo Kabushiki Kaisha, Tokyo, Japan

[21] Appl. No.: 535,510

[22] Filed: Sep. 26, 1983

[30] Foreign Application Priority Data

Oct. 1, 1982 [JP] Japan .............................. 57-173627

[51] Int. Cl.$^4$ ..................... G01R 31/02; F02N 11/08
[52] U.S. Cl. ...................... 324/158 MG; 123/179 B; 340/52 F
[58] Field of Search ............ 324/158 MG; 340/52 R, 340/62, 635, 52 F; 123/179 B

[56] References Cited

U.S. PATENT DOCUMENTS

| 3,712,283 | 1/1973 | Kiess | 123/179 B |
| 3,938,075 | 2/1975 | Reddy | 340/52 R |
| 4,219,798 | 8/1980 | Frister | 340/52 F |
| 4,244,340 | 1/1981 | Herth et al. | 123/440 |
| 4,246,566 | 1/1981 | Endo et al. | 340/52 F |

Primary Examiner—Ernest F. Karlsen
Attorney, Agent, or Firm—Martin A. Farber

[57] ABSTRACT

A system for diagnosing an internal combustion engine having a starter operation sensor. A starter operation diagnosing circuit is provided to response to the output voltage of the sensor for producing a signal when the voltage exceeds a predetermined range. A signal generating circuit is provided responsive to engine speed at the starting of the engine and to produce a fail-safe signal dependent on the engine speed so as to perform starting of the engine.

5 Claims, 3 Drawing Figures

SYSTEM FOR DIAGNOSING AN INTERNAL COMBUSTION ENGINE

BACKGROUND OF THE INVENTION

The present invention relates to a diagnosis system for internal combustion engines, and more particularly to a system for diagnosing failure of a starter operation sensor of an engine mounted on a motor vehicle.

An electronic fuel-injection system of the type which is provided with a computer operable to compute various factors, such as starter operation, throttle position, volume of intake airflow, intake manifold vacuum and coolant temperature in order to produce output signals for driving solenoid-operated injection valves is known. The starter operation sensor is provided to produce a starter signal, when a starter for the engine is operated. With a cooled engine, air-fuel mixture is enriched by the starter signal. If trouble occurs in the starter operation sensor system, the starter signal is not applied to the computer. Consequently, lean air-fuel mixture is supplied to the engine, which causes difficulty in the starting of the engine. On the other hand, if the starter signal supply continues after starting the engine, the mixture is extremely enriched, which decreases the driveability of the vehicle and further will stall the engine.

SUMMARY OF THE INVENTION

It is an object of the present invention to provide a system for diagnosing fault in a starter operation sensor system, in which an engine speed signal is used to sense the operation of a starter and a fail-safe signal is produced in dependency on the engine speed signal so as to prevent failure of starting of an engine or stalling of the engine.

According to the present invention, there is provided in a system for diagnosing an internal combustion engine having a starter operation sensor, the improvement comprising a starter operation diagnosing circuit responsive to output voltage of said starter operation sensor for producing an output when said output voltage exceeds a predetermined range; means for generating output voltage dependent on engine speed; a signal generating circuit responsive to said output voltage of said means for producing a fail-safe signal in dependency on said output voltage; and gate means responsive to said output of said starter operation diagnosing circuit for passing said fail-safe signal.

The present invention will be more apparent from the following description made with reference to the accompanying drawings.

DETAILED DESCRIPTION OF THE PREFERRED EMBODIMENT

Figure 1:
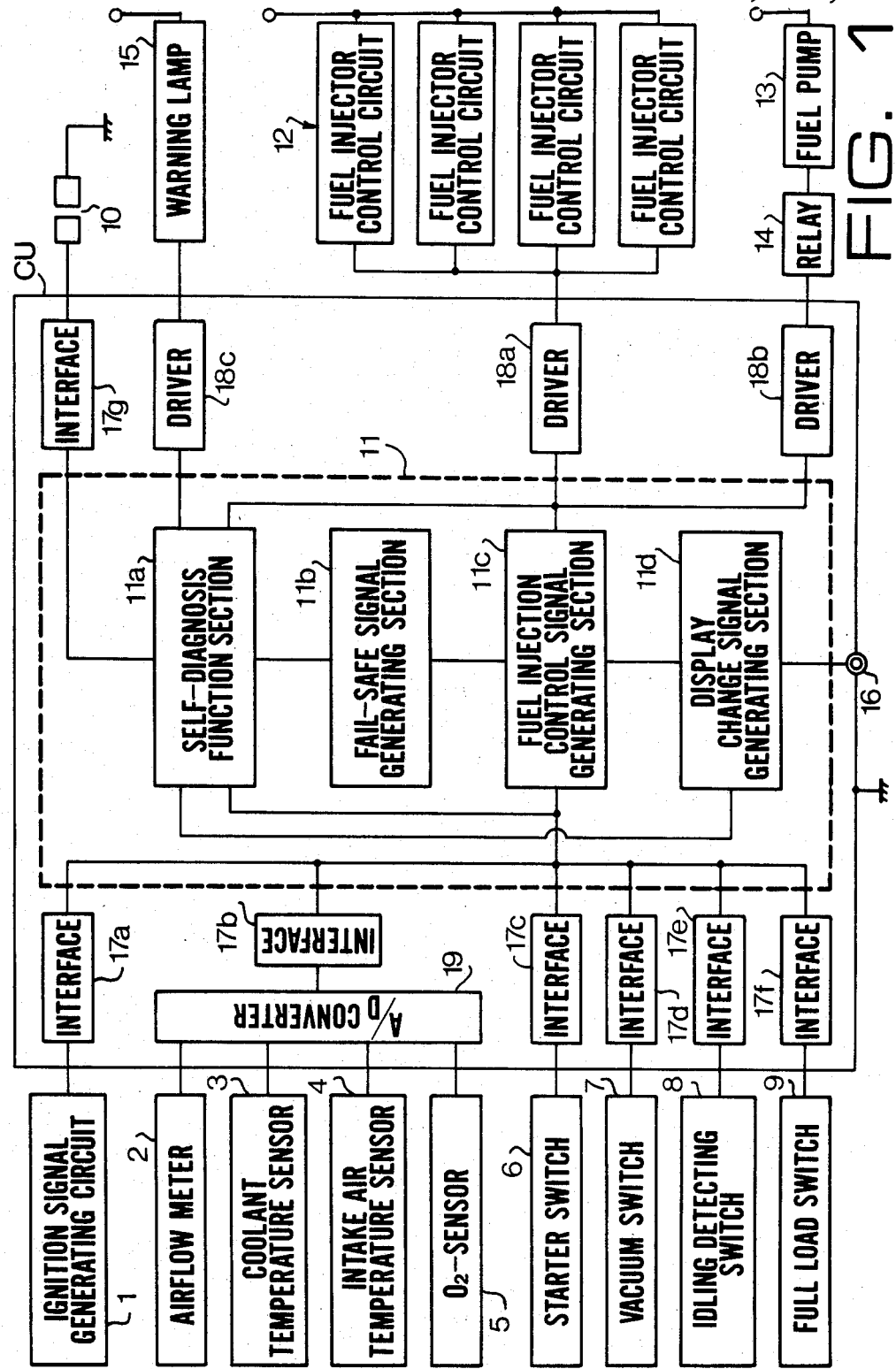
FIG. 1 is a block diagram showing a diagnosis system for operation of an engine.

FIG. 1 diagrammatically shows a diagnosis system for operation of an engine including a system of the present invention. The system comprises an engine operation detecting means group 1 to 9, and a control unit CU. The control unit CU comprises a computer 11 including memories, I/O and timers, interface group 17a to 17g, drivers 18a to 18c. The detecting means group comprises an ignition signal generating circuit 1, the output signal of which represents an ignited cylinder of the engine and ignition timing thereof, an airflow meter 2, a coolant temperature sensor 3, an intake air temperature sensor 4, and an $O_2$-sensor 5 for detecting oxygen concentration in exhaust gases. The detecting means group further comprises a starter operation sensor 6 for detecting operation of a starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking of fault. When the terminal 10 is connected to the ground at a shop, a fault condition memorized in the display change signal generating section 11d is displayed by the lamp 16. During driving of the motor vehicle, the terminal 10 is disconnected from the ground.

The output of the ignition signal generating circuit 1 is applied to the self-diagnosis section 11a and fuel injection control signal generating section 11c through the interface 17a. Outputs of the airflow meter 2 and sensors 3 to 5 are applied to the section 11a and 11c through an A/D converter 19 and the interface 17b.

Further, outputs of the sensor and switches 6 to 9 are applied to sections 11a and 11c through interfaces 17c to 17f, respectively.

The self-diagnosis function section 11a monitors inputs from the engine operation detecting means group 1 to 9 and when any fault is detected, a signal is sent to a warning lamp 15 through the driver 18c to warn of the fault. Further, when such a serious engine trouble that will stall the engine occurs, the self-diagnosis function section 11a sends a diagnosis signal dependent on the kind of the engine trouble to the fail-safe signal generating section 11b. The fail-safe signal generating section 11b stores a plurality of data to avoid engine stalling caused by the engine trouble and produces a fail-safe signal dependent on the diagnosis signal. The fail-safe signal is fed to the fuel injection control signal generating section 11c which operates to stop the input from the detecting means group 1 to 9.

In normal engine operation, the fuel injection control signal generating section 11c operates to produce an air-fuel ratio control signal by computing inputs applied from the engine operation detecting means group 1 to 9. The air-fuel ratio control signal is fed to a fuel pump 13 through the driver 18b and a relay 14 and to fuel injector control circuits 12 through the driver 18a so as to inject fuel of a proper amount at a proper time. Further, the fuel injection control signal generating section 11c sends a signal to a switching section 11d in response to an input from the $O_2$-sensor 5. The switching section 11d sends a signal to the monitor lamp 16 in response to the signal from the fuel injection control signal generating section 11c to indicate a fact that normal oxygen concentration is included in the exhaust gases.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to the fuel injection control circuits 12, so that the engine continues to operate in accordance with the quasi signal without stalling.

Further, the switching section 11d sends a signal to the lamp 16 in dependency on the diagnosis signal fed from the self-diagnosis function 11a. The lamp 16 intermittently lights in accordance with a pattern which is decided by the diagnosis signal by connecting the terminal 10 to the ground at a shop. An inspector in the shop can know the kind of the engine trouble by the pattern of the lighting of the lamp 16.

In accordance with the present invention, when fault occurs in the starter operation sensor system, the self-diagnosis function section 11a generates a signal and the signal is fed to the fail-safe signal generating section 11b.

Figure 2:
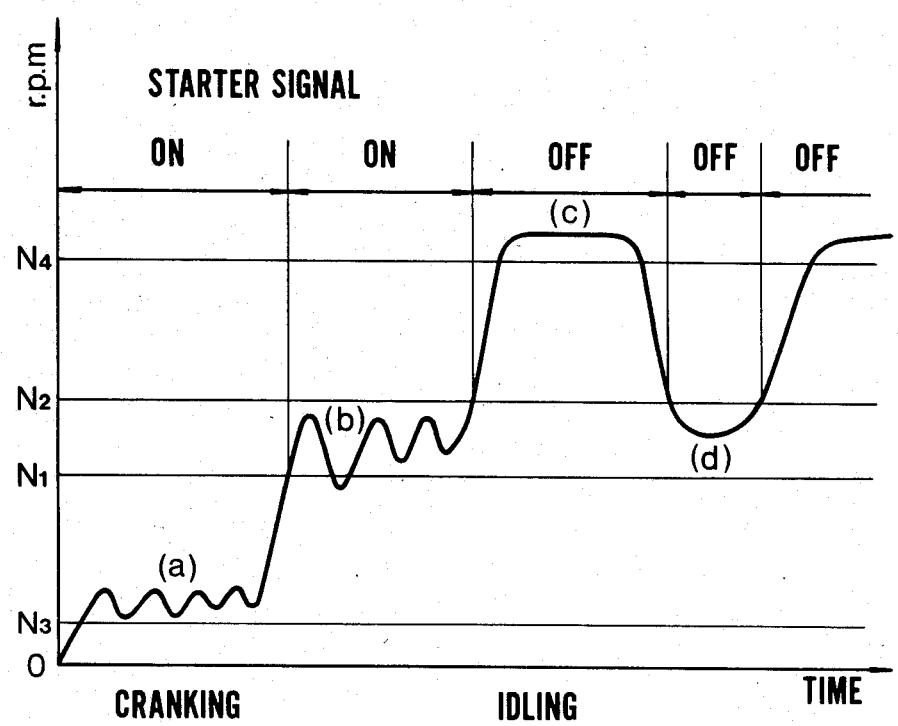
FIG. 2 is a graph showing a variation of engine speed at the start thereof.

FIG. 2, shows variation of engine speed at the start thereof. In the graph, $N_1$ is a lower level of engine speed at firing during the cranking of an engine and $N_2$ is a higher level of engine speed at firing during the cranking of the engine. A range (a) shows variation of engine speed below $N_1$ at cranking, range (b) shows the engine speed below $N_2$ at firing, and ranges (c) and (d) show idling speed.

The output of the starter operation sensor 6 normally is at a high level in ranges (a) and (b) and is at a low level in ranges (c) and (d). If trouble occurs in the starter operation sensor system, the output is at a low level when the starter is operated in ranges (a) and (b).

Figure 3:
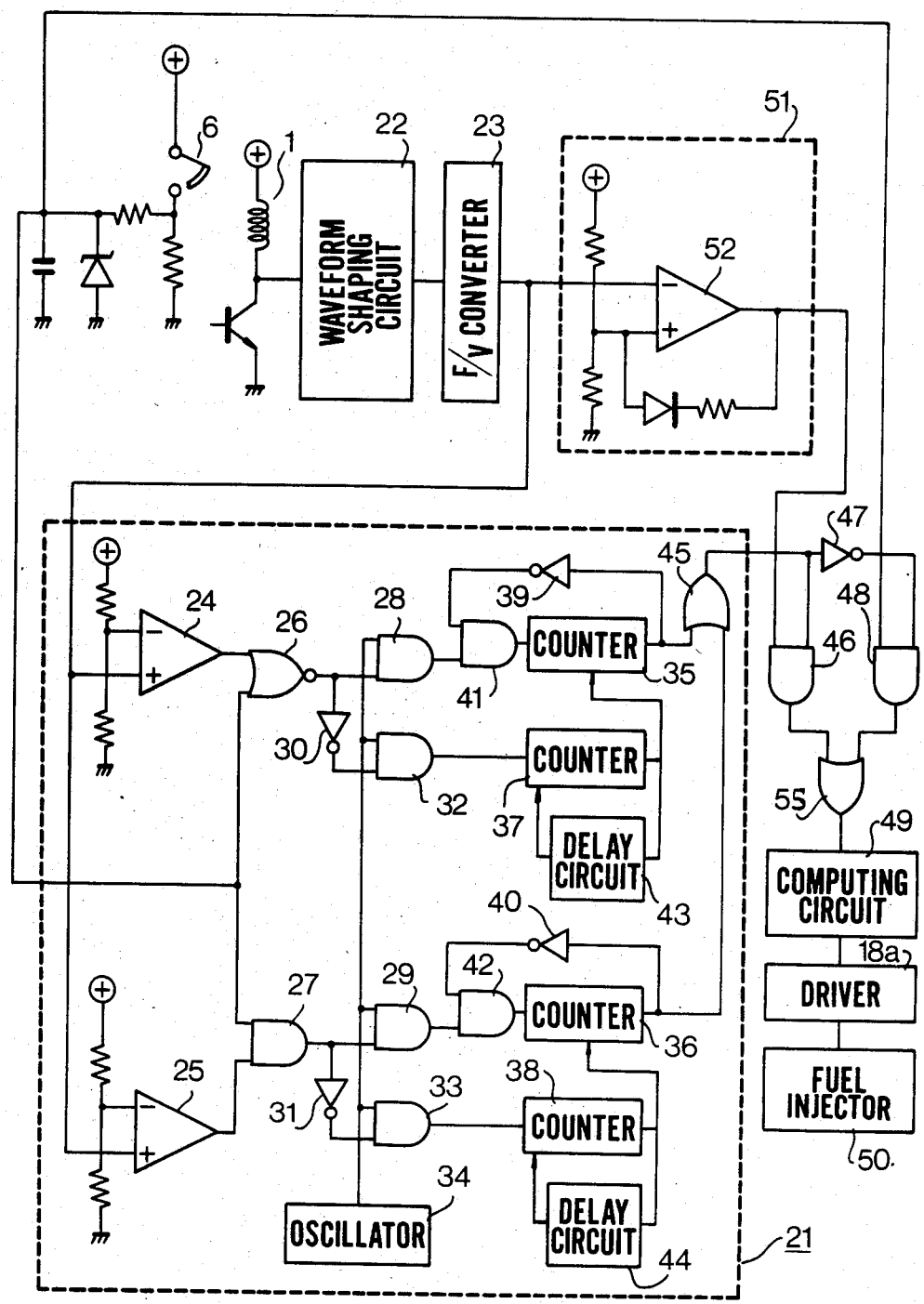
FIG. 3 is a starter operation sensor diagnosing circuit according to the present invention.

FIG. 3 shows a diagnosing circuit for the starter operation sensor system, which is included in the self-diagnosis function section 11a (FIG. 1). The output of the starter operation sensor 6 is fed to a diagnosing circuit 21 and the output of the ignition signal generating circuit 1 is shaped by a waveform shaping circuit 22 and converted by a frequency-to-voltage (F/V converter) 23. The output of the converter 23 is applied to a comparator 52 of a fail-safe signal generating circuit 51 and to window comparators 24 and 25 of the diagnosing circuit 21. The comparator 24 produces a low level output, when engine speed is below a predetermined low value $N_3$ which represents a speed at cranking and produces a high level output, at the cranking. The comparator 25 produces a high level output, when the engine speed reaches engine speed $N_4$ which means that the engine is started. The output of the comparator 24 is applied to a NOR gate 26 and the output of the comparator 25 is applied to an AND gate 27. The NOR gate 26 and AND gate 27 are applied with the output of the starter operation sensor 6.

When engine speed is between $N_3$ and $N_4$, that is the engine is cranked, comparator 24 generates a high level output and comparator 25 generates a low level output. Therefore, NOR gate 26 and AND gate 27 produce low level outputs respectively, irrespective of the level of the input from the starter operation sensor 6. If trouble occurs in the starter operation sensor 6 at cranking, the output thereof becomes low. Accordingly, when the engine speed is lower than the speed $N_3$, the output of the NOR gate 26 is at a high level. On the other hand, after the engine is started and engine speed exceeds the speed $N_4$, if the output of the starter operation sensor 6 is kept at a high level, which means that trouble occurs in the sensor, the output of the AND gate 27 goes to a high level. That is to say, the fact that NOR gate 26 or AND gate 27 produces a high level output means that trouble occurs in the starter operation sensor 6.

The output of the NOR gate 26 is applied to an AND gate 28 and also to an AND gate 32 through an inverter 30. The output of the AND gate 27 is applied to an AND gate 29 and to an AND gate 33 through an inverter 31. AND gates 28, 32, 29 and 33 are applied with pulses from an oscillator 34 to produce pulses in dependency on the outputs of NOR gate 26 and AND gate 27.

The diagnosing circuit 21 is provided with first and second counters 35 and 36 for detecting trouble of the sensor 6 and third and fourth counters 37 and 38 for resetting the first and second counters 35 and 36.

If the output voltage of the NOR gate 26 is at a high level, the AND gate 28 produces pulses. The pulses are applied to the counter 35 through an AND gate 41. When the count of the counter 35 exceeds a set count during fault of the sensor, the counter 35 produces a high level output. The output is applied to the other input of the AND gate 41 through an inverter 39, so that the AND gate 41 is closed to hold the output of the counter 35. The output of the counter 35 is applied to an AND gate 46 and also applied to an AND gate 48 through an inverter 47.

It is necessary to reset counters 35 and 36, if the trouble in the starter operation sensor 6 recovers after a short time. Counters 37 and 38 are to reset the counters 35 and 36.

Outputs of NOR gate 26 and AND gate 27 are at low levels in normal operating conditions, so that AND gates 32 and 33 are opened to produce pulses. When the number of pulses applied to counters 37 and 38 reaches a predetermined value which corresponds to the above-described short time, counters 37 and 38 produce outputs, respectively. The output is applied to reset terminals of counters 35 and 36 to reset them and also applied to their own reset terminals through delay circuits 43 and 44. Thus, the reset operation of the counters 35 and 36 is repeated as long as the starter operation sensor 6 is in normal condition.

In normal condition, the output of the OR gate 45 is at a low level, so that AND gate 46 is closed and AND gate 48 is opened. Accordingly, the output of the starter operation sensor 6 is applied to a computing circuit 49 through AND gate 48 and OR gate 55. The computing circuit 49 produces an output dependent on the output of the sensor 6, which is fed to a fuel injector 50 through the driver 18a to supply a proper amount of fuel in order to start the engine.

On the other hand, the output of the ignition signal generating circuit 1 is applied to a comparator 52 of the fail-safe signal generating circuit 51. The comparator 52 is arranged to have a hysteresis in operation so as to coincide with changes of outputs of the window comparators 24 and 25. More particularly, when engine speed exceeds the speed $N_4$, the comparator 52 produces a high level output, and when engine speed decreases below the speed $N_3$, the comparator 52 produces a high level output.

When fault occurs in the starter operation sensor 6 and the OR gate 45 produces a high level output, the AND gate 48 is closed and AND gate 46 is opened. Thus, the fail-safe signal from the fail-safe signal generating circuit 51 is fed to the computing circuit 49 through the AND gate 46 and OR gate 55. The computing circuit 49 produces a quasi air-fuel ratio control signal in response to the fail-safe signal. The quasi air-fuel ratio control signal is fed to the fuel injector 50 through the driver 18a to inject the fuel at a proper air-fuel ratio so as to start the engine.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. In a system for diagnosing an internal combustion engine having a starter and a starter operation sensor, the improvement comprising:

a starter operation diagnosing circuit responsive to output voltage of said starter operation sensor and to engine speed for signaling a condition of operation of said starter, said diagnosing circuit producing an output signal when said output voltage exceeds a predetermined range;

means for generating a second voltage dependent on the engine speed;

a signal generating circuit responsive to said second voltage for producing a fail-safe signal in dependency on a magnitude of said second voltage; and gate means responsive to said fail-safe signal and to said output signal of said diagnosing circuit for providing a signal to operate the engine.

2. The system for diagnosing an internal combustion engine according to claim 1, wherein
   said diagnosing circuit comprises window comparators, means for changing outputs of said comparators to pulses, and counters for counting said pulses, each of said counters being adapted to produce an output when the count reaches a predetermined count.

3. The system according to claim 2, wherein said signal generating circuit comprises a comparator having a hysteresis coinciding with changes in outputs of said window comparators of said diagnosing circuit.

4. The system according to claim 1, wherein
   said signal generating circuit includes an operational amplifier having a feedback line comprising a diode and resistor in series, the diode being poled toward the output of the amplifier and a voltage divider connected to an input of the amplifier connected to said feedback line.

5. In a system for diagnosing an internal combustion engine having a starter and a starter operation sensor, the improvement comprising:

a starter operation diagnosing circuit being responsive to output voltage of said starter operation sensor comprising a first output signal of said starter operation sensor and to engine speed for signaling a condition of operation of said starter, said diagnosing circuit producing a second output signal when said starter operation sensor does not produce the first output signal in an engine starting speed range and respectively when said starter operation sensor produces the first output signal at an engine speed out of the starting speed range when said output voltage exceeds a predetermined range;

means for generating another output voltage dependent on the engine speed;

a signal generating circuit responsive to said another output voltage for producing a fail-safe signal in dependency on a value of said another output voltage when the starter operation diagnosing circuit produces the second output signal; and gate means responsive to said fail-safe signal and to said second output signal of said diagnosing circuit for providing a signal to operate the engine.

* * * * *